(12) United States Patent
Xia et al.

(10) Patent No.: US 8,811,815 B2
(45) Date of Patent: Aug. 19, 2014

(54) OPTICAL NETWORK TESTING

(75) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 473 days.

(21) Appl. No.: 12/426,313

(22) Filed: Apr. 20, 2009

(65) Prior Publication Data

US 2010/0266275 A1   Oct. 21, 2010

(51) Int. Cl.
*H04B 10/08* (2006.01)
*H04B 17/00* (2006.01)

(52) U.S. Cl.
USPC ........ 398/16; 398/9; 398/10; 398/11; 398/12; 398/13; 398/14; 398/17; 398/18; 398/19; 398/20; 398/25; 398/26; 398/27; 398/28; 398/29; 398/30; 398/31; 398/32; 398/33; 398/34; 398/35

(58) Field of Classification Search
None
See application file for complete search history.

(56) References Cited

U.S. PATENT DOCUMENTS

| | | | |
|---|---|---|---|
| 5,119,017 A * | 6/1992 | Labarre et al. | 324/76.19 |
| 6,580,531 B1 * | 6/2003 | Swanson et al. | 398/5 |
| 6,934,470 B1 * | 8/2005 | Kunst et al. | 398/38 |
| 2002/0034202 A1 * | 3/2002 | Ishizaka | 372/43 |
| 2003/0149921 A1 * | 8/2003 | Lau et al. | 714/704 |
| 2004/0081459 A1 * | 4/2004 | Mumm et al. | 398/16 |
| 2004/0109227 A1 | 6/2004 | Shin et al. | |
| 2004/0145799 A1 * | 7/2004 | Sedic | 359/325 |
| 2004/0151494 A1 * | 8/2004 | King et al. | 398/16 |
| 2005/0069247 A1 | 3/2005 | Gorni et al. | |
| 2005/0089027 A1 | 4/2005 | Colton | |
| 2007/0033448 A1 * | 2/2007 | Waschura et al. | 714/704 |
| 2008/0054741 A1 | 3/2008 | Oyama | |
| 2008/0085115 A1 * | 4/2008 | Turukhin et al. | 398/34 |
| 2008/0232760 A1 | 9/2008 | Xia | |
| 2009/0028554 A1 | 1/2009 | Anderson et al. | |
| 2010/0150546 A1 * | 6/2010 | Shrikhande et al. | 398/10 |

OTHER PUBLICATIONS

Sampson et al., "100 mW spectrally-uniform broadband ASE source for spectrum-sliced WDM systems", Sep. 15, 1994, Electronic Letters, vol. 30, No. 19, pp. 1611-1612.*

* cited by examiner

Primary Examiner — Darren E Wolf

(57) ABSTRACT

A method includes generating a test signal and modulating the test signal. The method may also include transmitting the test signal on an optical path, where the optical path may include a number of add-drop multiplexer devices and amplifiers. The method may also include receiving the test signal at a destination device and converting the received test signal into an electrical signal. The method may further include identifying a portion of the electrical signal that is associated with the modulated test signal.

15 Claims, 8 Drawing Sheets

OPTICAL NETWORK TESTING

BACKGROUND INFORMATION

Routing data via optical networks has become increasingly more common. A typical optical network includes a number of components that may affect the overall pass-band characteristics in the network. For example, various filters located throughout the network may affect the overall pass-band of optical paths in the network. Therefore, testing the optical network is important to ensure adequate data throughput.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to testing an optical path's end-to-end pass-band characteristic. The optical path may pass through a number of amplifiers, a number of nodes (e.g., nodes that include optical add-drop multiplexers), etc. In one exemplary implementation, a source signal may be modulated at a particular frequency to provide an input test signal that fills the spectrum of an input channel. As the test signal passes through a number of amplifiers and filters, noise that encompasses the entire spectrum may be introduced to the signal. At the terminating node of the optical path, circuitry may be used to detect the portion of the modulated test signal that passed through all the nodes. In an exemplary implementation, the portion of the modulated test signal that passed through all the nodes may be used to determine the overall, end-to-end pass-band characteristic of the optical path.

Figure 1:
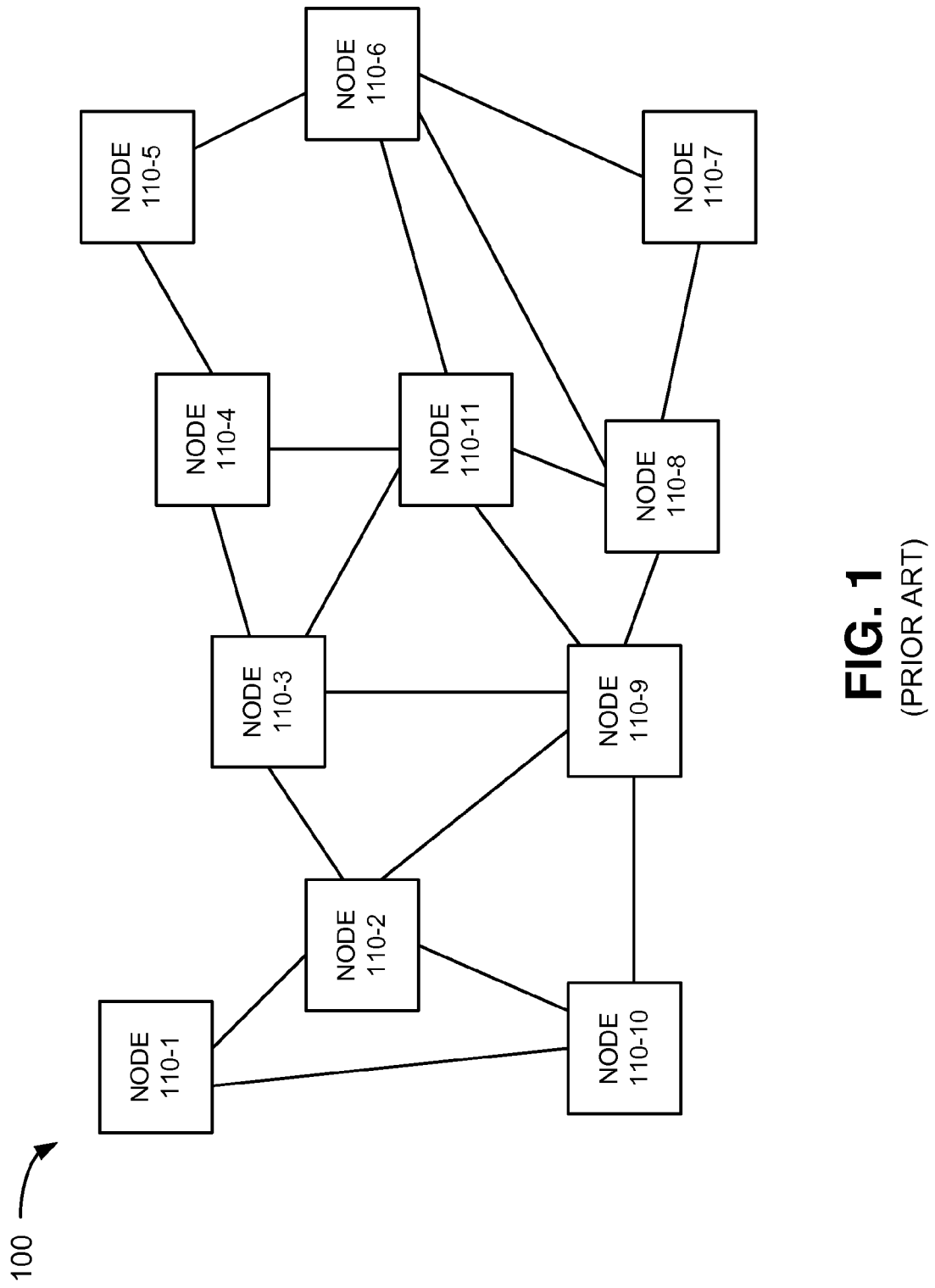
FIG. 1 illustrates an exemplary network in which systems and methods described herein may be implemented.

FIG. 1 is a block diagram of an exemplary network 100 in which systems and methods described herein may be implemented. Network 100 may represent a mesh network that includes a number of nodes 110-1 through 110-11, referred to collectively as nodes 110 and individually as node 110 or node 110-N (where N represents any value). In mesh network 100, each line connecting one of nodes 110 to another of nodes 110 may represent one or more optical fibers interconnecting the nodes 110. Each optical fiber may also include a large number of individual channels upon which data may be transmitted. For example, data in network 100 may be transmitted using wavelength division multiplexing (WDM) in which multiple optical carrier signals are transmitted on a single optical fiber by using different wavelengths of laser light or electromagnetic radiation to carrier different signals.

In some implementations, data in network 100 may be transmitted using dense wave division multiplexing (DWDM) which utilizes the C-band and/or L-band frequencies. The term "light" as used herein should be construed to include any type of electromagnetic radiation, and not just electromagnetic radiation in the visible light frequency range.

In an exemplary implementation, each node 110 may represent an optical add-drop multiplexer (OADM), such as a reconfigurable optical add-drop multiplexer (ROADM) that can switch traffic. For example, each node 110, also referred to herein as ROADM 110, may include a ROADM that can remotely switch traffic transmitted using WDM or DWDM at the wavelength layer. Each ROADM included in nodes 110 may include one or more tunable filters that receive a stream of optical signals having different wavelengths and can direct a selected channel onto a particular output port. By using a ROADM, individual or multiple optical channels having different wavelengths may be added and/or dropped from a transport optical fiber without requiring node 110 to convert the optical signals on all the WDM channels to non-optical (i.e., electrical) signals and then back to optical signals.

Figure 2:
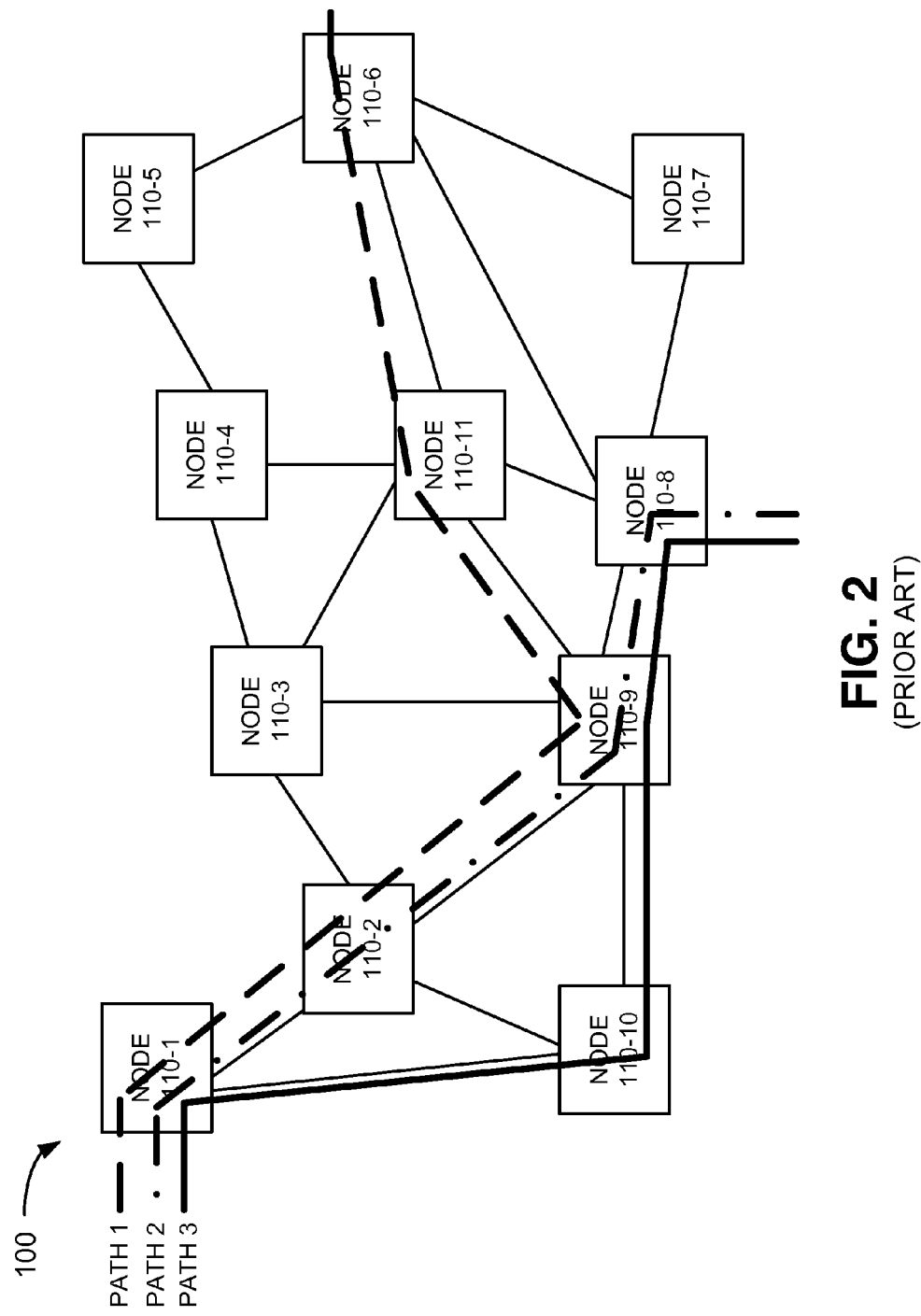
FIG. 2 illustrates exemplary paths in the network of FIG. 1.

As illustrated in FIG. 1, each node 110 in network 100 may be connected to several other nodes 110 to form a mesh network that allows traffic from a source to a destination to be routed in several different ways. For example, FIG. 2 illustrates exemplary paths through network 100. Referring to FIG. 2, traffic may be transmitted from node 110-1 to node 110-8 via path 2 (shown by the dotted and dashed line), which includes nodes 110-1, 110-2, 110-9 and 110-8. Alternatively, traffic may be transmitted from node 110-1 to node 110-8 via path 3 (shown via the heavy solid line), which includes nodes 110-1, 110-10, 110-9 and 110-8. Network 100 may route data from node 110-1 to node 110-8 using either of paths 2 or 3. Similarly, network 100 may include multiple paths connecting other ones of nodes 110 and may use a particular path based on network conditions. For example, data may be transmitted from node 110-1 to node 110-6 via path 1 (shown with the dashed line). Having multiple paths interconnecting nodes 110 allows traffic to be transmitted on network 100 to avoid congested portions of network 100 and/or portions of network 100 where a failure may have occurred.

The exemplary network configuration illustrated in FIG. 1 and exemplary paths illustrated in FIG. 2 are provided for simplicity. It should be understood that a typical network 100 may include more or fewer nodes 110 than illustrated in FIG. 1 and more paths than illustrated in FIG. 2. Network 100 may also include additional elements, such as amplifiers, switches, gateways, routers, monitoring systems, etc., that aid in routing traffic toward its intended destination.

As described above, each of nodes 110 may represent a ROADM used to switch signals at the wavelength layer. That is, each ROADM 110 may include a multiplexing device that allows the ROADM to add one or more channels on a fiber, as well as a demultiplexing device that allows the ROADM to drop one or more channels on a fiber. Each ROADM 110 may also include one or more tunable filters that has its own pass-band characteristic. For example, filters located in ROADMs 110 may be individually tuned based on, for example, temperature conditions, and each filter could be offset by a different amount. For example, a filter at a first ROADM 110 in a path (e.g., ROADM 110-1) may be offset to the left of the center frequency by 5 gigahertz (GHz), while a filter at another ROADM 110 in the path (e.g., ROADM 110-10) may be offset to the right by 6 GHz. Therefore, the overall pass-band performance of a channel depends largely on the summation of the pass-band characteristics of all ROAMDs 110 along the optical path from the transmitter to the receiver. Using a standard spectrum analyzer at each ROADM 110, however, only characterizes the last filter/ROADM. For example, amplifiers located at nodes 110 and elsewhere in network 100 (i.e., not just at nodes 110) typically generate continuous wave (CW) amplified stimulated emissions (ASE) that cover the entire spectrum. As a result, each filter located at ROADMs 110 captures the band pass of the preceding filter, including all of the noise that was transmitted with the signal. Therefore, testing a single filter would not allow a network engineer to identify the pass-band characteristics of the channel in its entirety. In addition, taking down an optical fiber to perform the testing at each filter along the channel would not be desirable since this would disrupt traffic in network 100.

Figure 3:
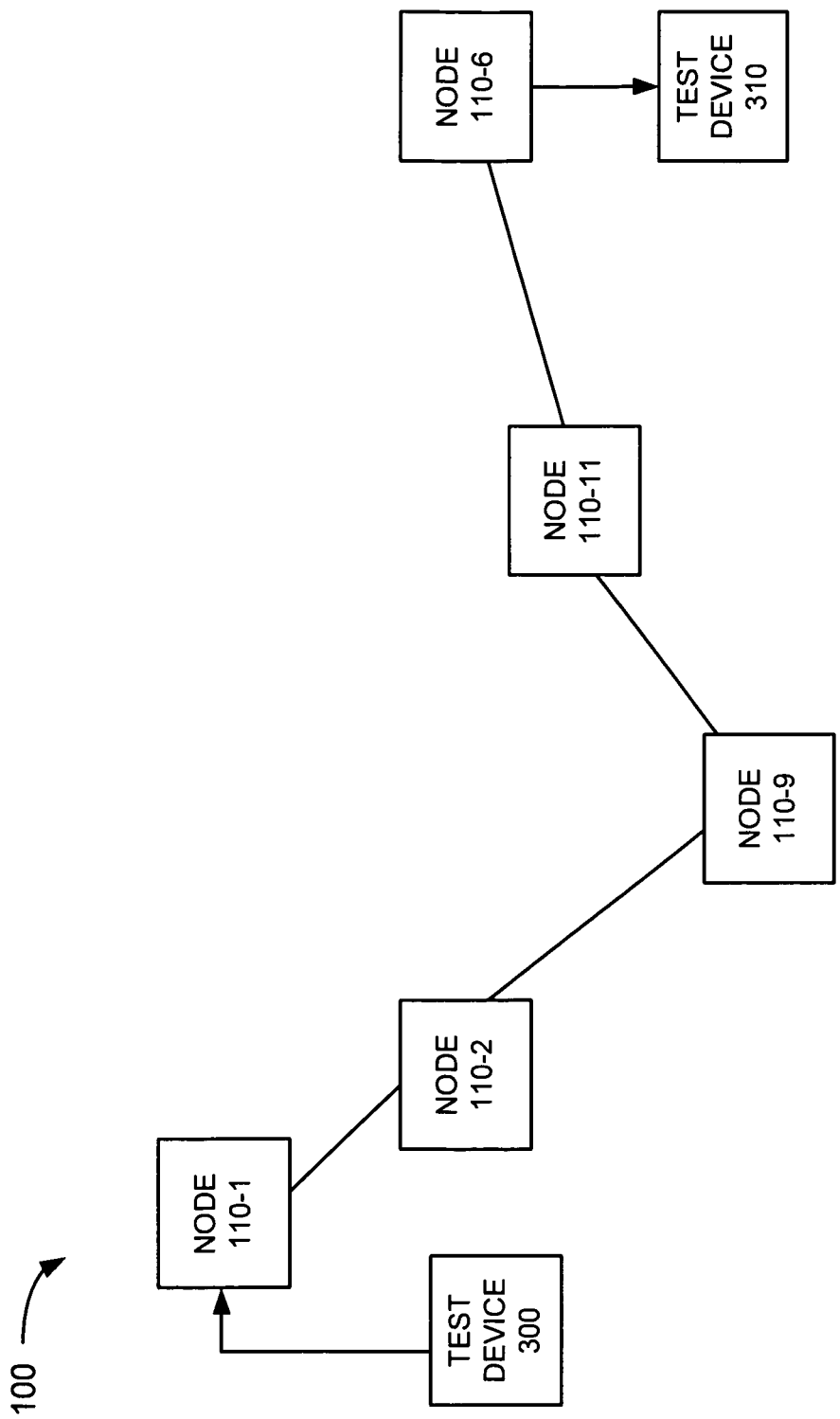
FIG. 3 illustrates an exemplary test scenario to test one of the paths of FIG. 2.

In accordance with an exemplary implementation, test devices for in-service testing may be configured to provide testing for an optical path in network 100 without taking any of nodes 110 out of service. For example, FIG. 3 illustrates an exemplary scenario in network 100 in which a transmitter test device 300 and a receiver test device 310 may be used to test an optical path, such as path 1 illustrated in FIG. 2. Referring to FIG. 3, test device 300 may represent a transmitter device used to generate and transmit a test signal on a selected channel at node 110-1. The test signal may be provided to node 110-1 and transmitted from node 110-1 to node 110-6 via nodes 110-2, 110-9 and 110-11. At the end of the path, test device 310 may represent a receiver device used to receive optical data, analyze the spectral content and determine the overall pass-band of the optical path, as described in more detail below.

Figure 4A:
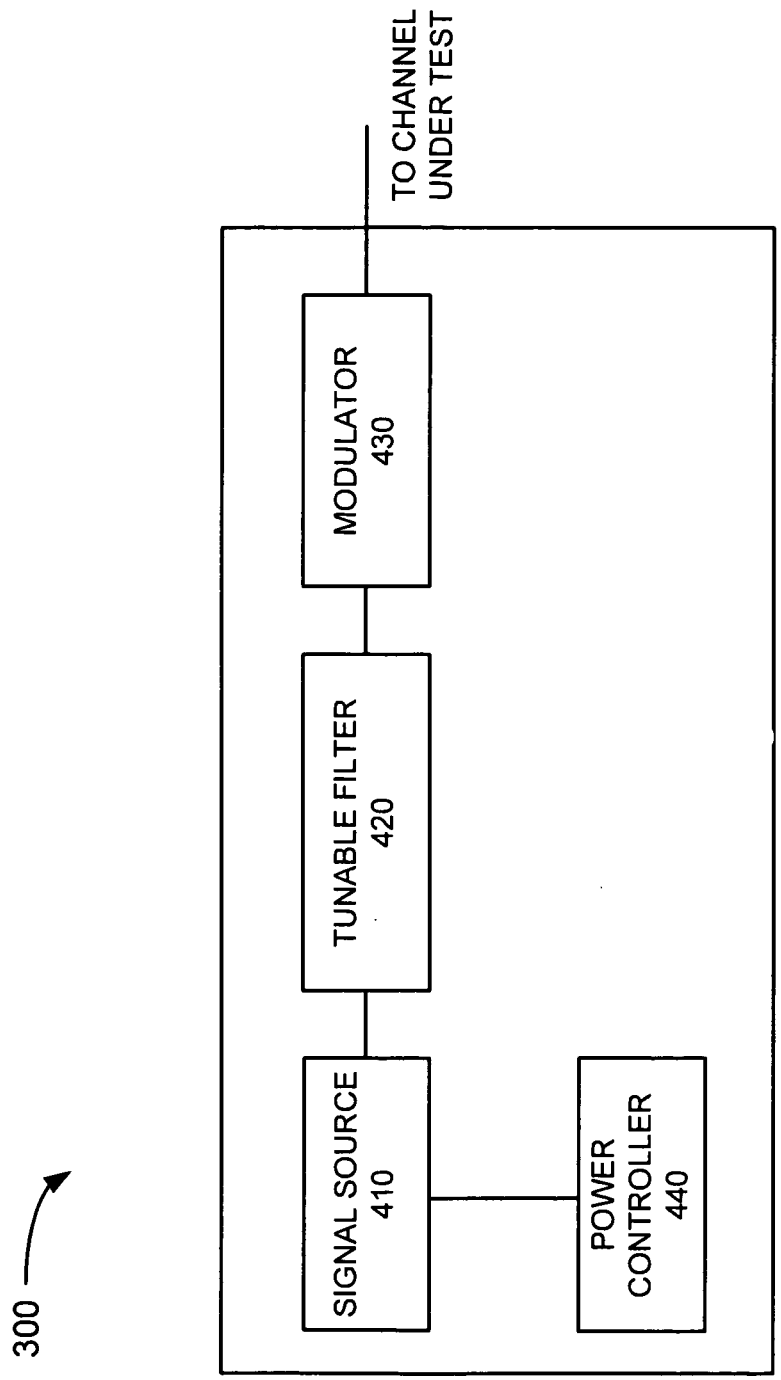
FIGS. 4A and 4B are block diagrams illustrating exemplary configurations of the transmitter test device of FIG. 3.

FIG. 4A illustrates an exemplary configuration of a test device 300 that may be coupled to any node 110 of network 100 for testing an optical path in network 100. Referring to FIG. 4A, test device 300 may include signal source 410, tunable filter 420, modulator 430 and power controller 440. The configuration illustrated in FIG. 4A is provided for simplicity. In other implementations, more or fewer components may be included in test device 300. For example, one or more display devices or user interfaces may be included in test device 300 to allow a network engineer (or other party) to initiate a test on an optical path. In addition, one or more power supplies, or other components may be included in test device 300 to facilitate testing.

Signal source 410 may include any conventional incoherent light source, such as an ASE source that emits a broadband spectrum. For example, signal source 410 may be an erbium doped fiber light source that emits a broadband spectrum in the C-band and/or in the L-band. Signal source 410 may also provide an optical signal adequate for high data rate testing, such as 100 gigabits per second (Gb/s) or more. In addition, in an exemplary implementation, signal source 410 may remain on while the testing is ongoing to ensure that the channel under test is not turned off by one or more of ROADMs 110 or that signals on the optical path are not significantly attenuated once power is no longer detected on the channel.

Tunable filter 420 may include one or more filtering devices for filtering light from signal source 410. In an exemplary implementation, tunable filter 420 may support 100 and 50 GHz channel spacing. For example, in one implementation, tunable filter 420 may be a filter having a 0.5-decibel (dB) bandwidth of 50 GHz, a 3-dB bandwidth of 70 GHz and a 20-dB bandwidth of 100 GHz. It should be understood that the nomenclature used above, such as 3-dB bandwidth (also referred to as 3-dB down bandwidth or −3 dB bandwidth) refers to a bandwidth where signal strength is 3 dB lower than its peak. The tuning range of tunable filter 420 may cover C-band and L-band wavelengths. In addition, the tuning accuracy of tunable filter 420 may be based on the 50 GHz international telecommunications unit (ITU) grid. It should also be understood that the values of tunable filter 420 listed above are exemplary only and tunable filter 420 may have other parameters based on the particular circumstances and/or optical path being tested.

Modulator 430 may include a modulator used to modulate the test signal generated by signal source 410, which may be filtered by tunable filter 420. In an exemplary implementation, modulator 430 may modulate the test signal from signal source 410 at a modulation frequency ranging from about 400 megahertz (MHz) to about 600 MHz. For example, in one implementation, modulator may modulate the test signal at a frequency of 500 MHz. It should be understood that other modulation frequencies or ranges of frequencies may be used by modulator 430. In each case, the modulated signal may be used by a receiver test device (e.g., test device 310) to distinguish the test signal from, for example, CW ASE generated by amplifiers and other devices in the optical path being tested, as described in more detail below.

Power controller 440 may be used to ensure that signal source 410 provides a signal having adequate power for testing portions of network 100. For example, depending on the particular ROADMs 110 and number of ROADMs that are part of the optical path being tested, different launch powers may be needed to transmit an optical test signal. In an exemplary implementation, power controller 440 may provide signal power ranging from approximately 0.5 milliwatts (mW) to 2.0 mW. In one implementation, a network engineer or technician may interact with a user interface/input device included on test device 300 (not shown in FIG. 4A) to enter the type of ROADMs 110 in the optical path being tested, and test device 300 will automatically provide the proper power level for signal source 410. In addition, power controller 440 or signal source 410 may ensure that the power of the test signal is maintained at a constant power level. This may help avoid or minimize automatic gain adjustment that may be performed by various circuits included in ROADMs 110 or elsewhere along the optical path. In other instances, power controller 440 may not be needed. That is, signal source 410 may be configured to provide adequate signal power (and having a constant power level) regardless of the optical path being tested.

Figure 4B:
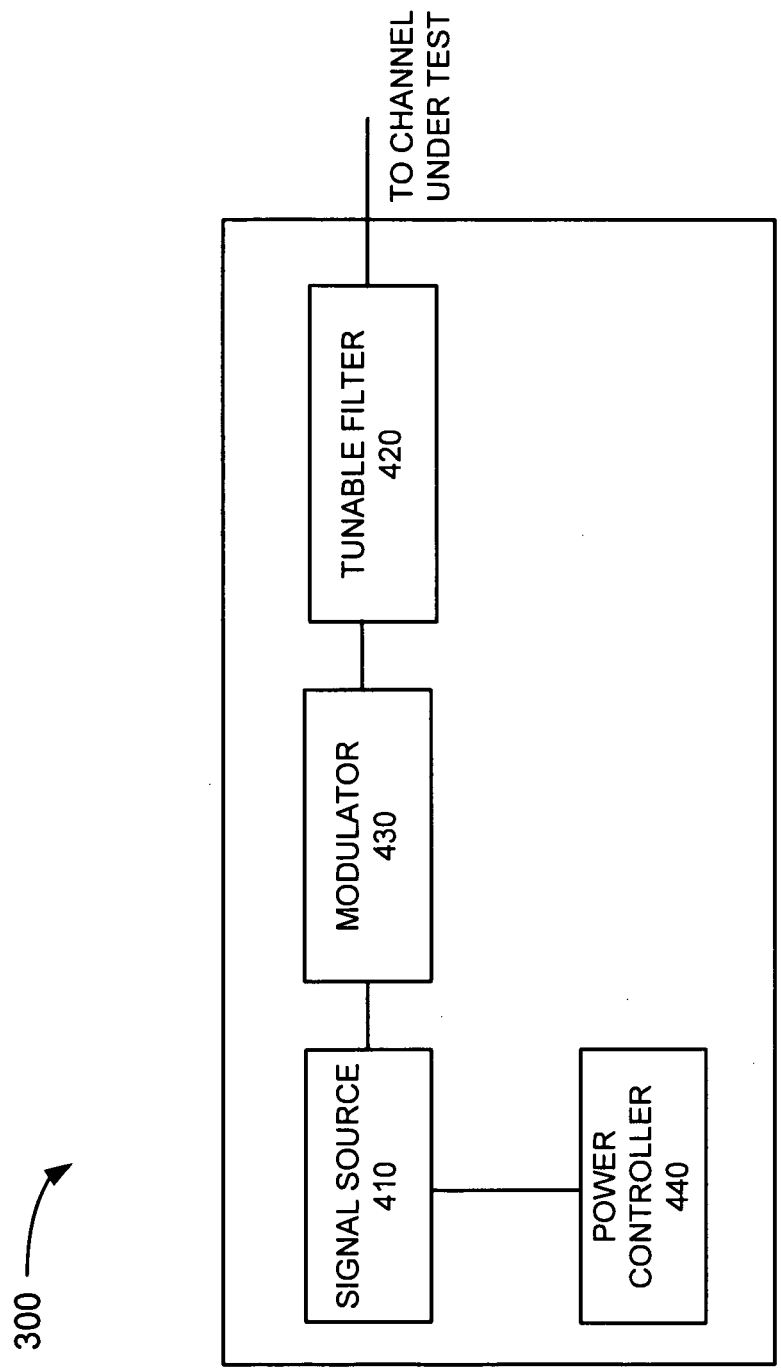

As described above, the configuration in FIG. 4A is exemplary only. For example, in other implementations, test device 300 illustrated in FIG. 4A may be configured differently. For example, FIG. 4B illustrates an alternative implementation of test device 300. Referring to FIG. 4B, modulator 430 may be directly coupled to signal source 410 to modulate the source signal prior to filtering by tunable filter 420. In each scenario, the modulated signal may be used by receiver test device 310 to identify the end-to-end pass-band characteristic of optical path 1, as described in detail below.

As described above, the exemplary configurations for test device 300 illustrated in FIGS. 4A and 4B are provided for simplicity. It should be understood that test device 300 may include more or fewer components than illustrated in FIGS. 4A and 4B. For example, in some exemplary implementations, one or more communication interfaces for receiving information from a remote device and/or providing information to a remote device associated with controlling an optical path test may be included in test device 300. This may allow all or a portion of an optical path test to be initiated, controlled and/or analyzed remotely with respect to ROADMs in network 100.

Figure 5:
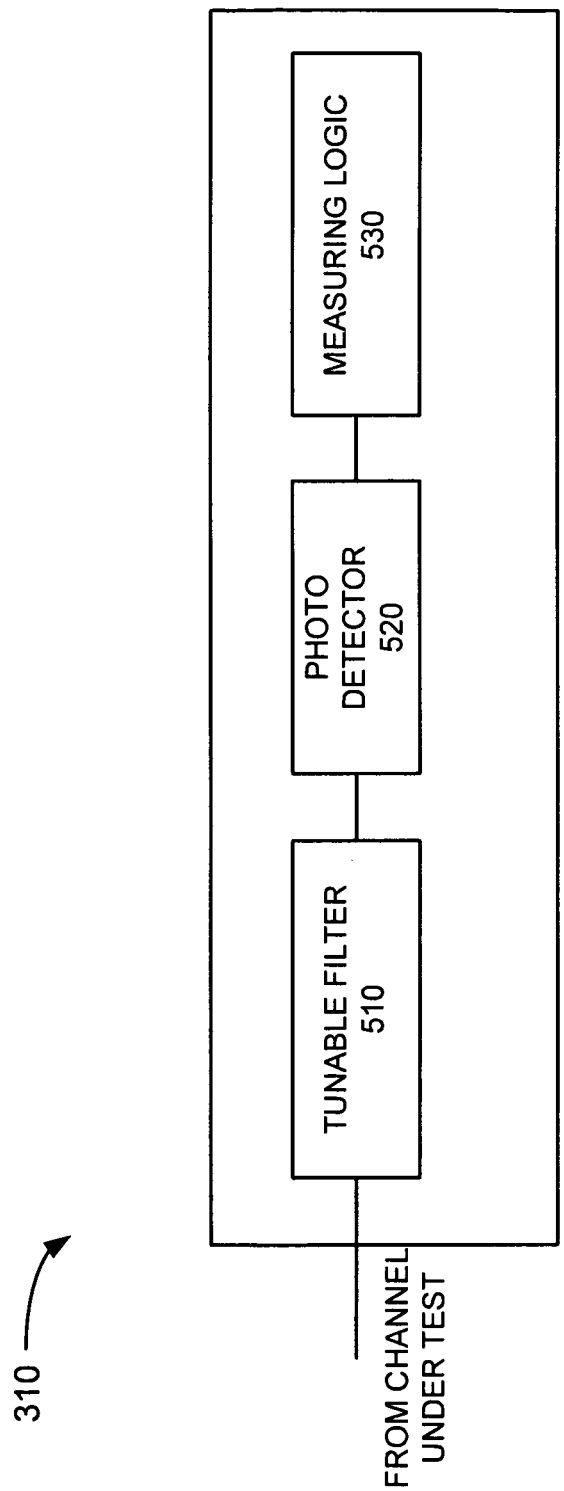
FIG. 5 is a block diagram illustrating an exemplary configuration of the receiver test device of FIG. 3.

Test device 300, as described above, may provide test data to one of ROADMs 110. Receiver test device 310 may receive the test signal for the channel under test from ROADM 110-6 and analyze the portion of network 100 illustrated in FIG. 3, as described in more detail below. FIG. 5 is an exemplary functional block diagram of components implemented in the receiver test device 310. Referring to FIG. 5, receiver test device 310 may include tunable filter 510, photo detector 520 and measuring logic 530. The configuration illustrated in FIG. 5 is provided for simplicity. In other implementations, more or fewer components may be included in test device 310. For example, one or more display devices or user interfaces may be included in test device 300 to allow a network engineer (or other party) to view results of a test on the optical path. In addition, one or more power supplies, or other components may be included in test device 310 to facilitate testing and analyzing test data.

Tunable filter 510 may include one or more filters for filtering received light. For example, as illustrated in FIG. 3, test device 310 may be coupled to a termination node associated with path 1 (i.e., node 110-6 in this example). Tunable filter 510 may include a receiver configured to receive the light transmitted on optical path 1 that passed through each of nodes 110-1, 110-2, 110-9, 110-11 and 110-6 and may filter the received light. In an exemplary implementation, tunable filter 510 may include a relatively narrow band filter. For example, in one implementation, tunable filter 510 may be a filter having a 3-dB bandwidth of 3 GHz and a 20-dB bandwidth of 10 GHz. The turning range of tunable filter 510 may cover C-band and L-band wavelengths and the tuning accuracy of tunable filter 510 may be approximately 1 GHz. It should be understood that these values are exemplary only and tunable filter 510 may have other parameters based on the particular circumstances and/or optical path being tested.

Photo detector 520 may include any photo detector or other device/circuitry that converts received light into electrical signals. For example, photo detector 520 may receive the output of tunable filter 510 and convert the optical output into electrical signals. Photo detector 520 may forward the electrical output to measuring logic 530.

Measuring logic 530 may include logic to receive the electrical output of photo detector 520 and analyze the output to identify the portion of the signal associated with signal source 410. For example, measuring logic 530 may identify the portion of the originally transmitted test signal from signal source 410 that was received by test device 310 and ignore noise, such as CW ASE, generated by amplifiers on the optical path. For example, in one implementation, measuring logic 530 may measure the alternating current (AC) portion of the signal output by photo detector 520. The AC portion of the electrical signal may represent the portion of the test signal modulated by modulator 430, as opposed to the direct current (DC) portion which may represent CW ASE generated by amplifiers in the optical path. In some implementations, measuring logic 530 may generate and output for display a frequency curve graph associated with the spectral output, a pass/fail indication with respect to the tested optical path, and/or some other information that will give a network engineer (or another party) information corresponding to the end-to-end pass-band of the optical path, as described in more detail below.

Figure 6:
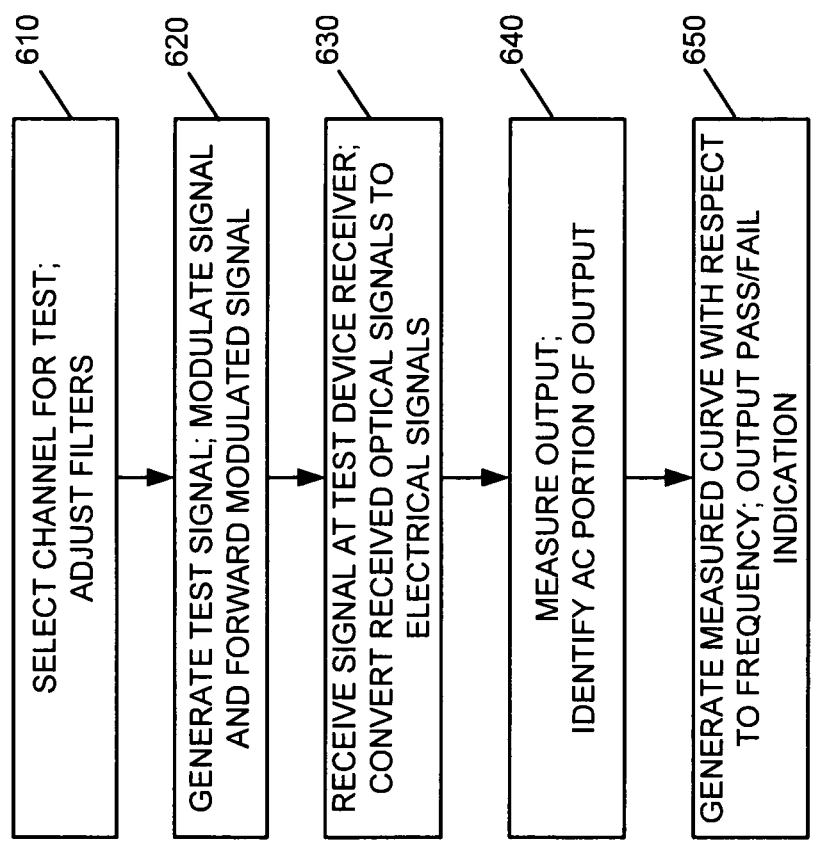
FIG. 6 is a flow diagram illustrating exemplary processing associated with testing the portion of the network shown in FIG. 3.

Test device 300 and test device 310, as described above, may operate to transmit and receive test data that may then be analyzed to determine a pass-band associated with a path in network 100. FIG. 6 is a flow diagram illustrating exemplary processing associated with testing an optical path and determining a pass-band characteristic of the path. Processing may begin by a network engineer or another party associated with monitoring network 100 identifying a path to test. For example, assume that a network engineer would like to test path 1 illustrated in FIGS. 2 and 3, which traverses nodes 110-1, 110-2, 110-9, 110-11 and terminates at node 110-6. As discussed above, testing each filter in ROADMs 110 would require that the entire optical path be taken down (i.e., out of service). In addition, each ROADM 110 would have to be analyzed individually and the pass-band characteristics for each ROADM 110 would have to be combined or correlated in some manner to attempt to determine some estimation of the overall pass-band characteristic of the path. In an exemplary implementation, in-service testing may be performed with respect to path 1 without requiring individual testing of each ROADM 110.

To accomplish in-service testing, the network engineer may select a channel associated with path 1 upon which the test will be run (act 610). For example, the network engineer may identify a channel associated with path 1 which is idle or otherwise unused through ROADMs 110 illustrated in FIG. 3. In one implementation, a large number of channels may exist on each fiber in network 100 (e.g., 80 or more) and one or more channels may be idle throughout the selected path. Assume that the network engineer identifies an idle channel in the path (act 610). Test device 300 may then be coupled to node 110-1, as illustrated in FIG. 3, and test device 310 may be coupled to node 110-6. Coupling test devices 300 and 310 to the appropriate nodes 110 may be accomplished by one or more network engineers or technicians.

The network engineer may then adjust tunable filter 420 to the International Telecommunications Union (ITU) grid of the selected channel (act 610). For example, the selected channel may have a particular associated frequency and tunable filter 420 may be adjusted to that frequency. The network engineer may also adjust tunable filter 510 to the frequency associated with the selected channel upon which the test is to be performed (act 610).

Signal source 410 may generate a test signal (act 620). For example, as discussed above, signal source 410 may be an incoherent light source, such as an ASE source, used to inject test signals to the designated channel on path 1. In this implementation, the network engineer may turn on signal source 410 to transmit ASE test signals to the appropriate channel at node 110-1. The data rate associated with the test signal may be set based on the particular optical path being tested. For example, if the optical path being tested typically carries data at rates of 100 Gb/s, signal source 410 may be set to provide a signal rate of 100 Gb/s. The test signal will have a center frequency and a spectrum associated with the signal that effectively fills the channel. As discussed above, signal source 410 may remain on during the testing to ensure that power remains on the channel so that the channel under test is not turned off by one or more of ROADMs 110 or that signals on the optical path are not significantly attenuated once power is no longer detected on the channel.

Assume that test device 300 is configured as illustrated in FIG. 4A. In this implementation, tunable filter 420 may receive the test signal, filter the test signal and forward the filtered signal to modulator 430. Modulator 430 may receive the output of tunable filter 420 and modulate the test signal (act 620). For example, as discussed above, in one exemplary implementation, modulator 430 may modulate the test signal/data at a frequency of 500 MHz. In addition, in some implementations, power controller 440 may be used to ensure that the power associated with the test signal is adequate with respect to the transmitting the test signal along the desired path (i.e., path 1 in this example). As discussed above, the power requirements may be based on the particular type of ROADMs associated with path 1. In other implementations, the power level may be pre-set in test device 300 for any number of different ROADMs being tested and the network engineer may simply enter, via a user interface on test device 300, the type of devices/ROADMs being tested. In either case, the modulated test signal may be transmitted through path 1 illustrated in FIG. 3 (act 620). As discussed above, signal source 410 may maintain a constant power to eliminate or minimize gain adjustment during the testing of optical path 1.

Test device 310 coupled to the last or terminating node 110 of path 1 will receive at least a portion of the test signal after the signal has passed through nodes 110-1, 110-2, 110-9, 110-11 and 110-6 (act 630). That is, test device 310 may include a receiver coupled to an optical fiber associated with path 1 that will receive a portion of the originally transmitted test signal that was not clipped or shifted by components in path 1, such as filters or other devices. As discussed above, a number of amplifiers may be located along path 1 to amplify the optical signals transmitted in network 100. These amplifiers typically generate CW ASE that fills the entire spectrum. Tunable filter 510 may receive the optical test signals received by the terminating node (i.e., node 110-6 in this example), along with CW ASE generated by amplifiers included in optical path 1. Tunable filter 510 may filter the received signal. For example, as discussed above, in one implementation, tunable filter 510 may filter the received signal to a relatively narrow range. As one example, tunable filter 510 may have a 3-dB bandwidth of 3 GHz, a 20-dB bandwidth of 10 GHz and a tuning accuracy of 1 GHz. Tunable filter 510 may output the filtered signal to photo detector 520.

Photo detector 520 may receive the filtered signal and convert the received optical data from the optical domain into the electrical domain (act 630). For example, photo detector 520 may convert the received optical waveform into corresponding electrical signals that represent the optical waveform output by node 110-6. Photo detector 520 may forward the electrical signals for analysis by measuring logic 530.

Measuring logic 530 may receive the electrical signals output by photo detector 520 and measure the received electrical signals to determine the overall pass-band characteristic of path 1 (act 640). For example, in an exemplary implementation, measuring logic 530 may measure the AC portion of the signal to identify the portion of the received signal that corresponds to the test signal generated by signal source 410 (act 640). For example, as discussed above, signal source 410 may be an ASE source and the output of ASE source may be modulated by modulator 430 at, for example, a frequency of 500 MHz. The AC portion of the received electrical signal from photo detector 520 corresponds to the portion of the modulated test signal that passed through all of ROAMDs 110 along the optical path.

In an exemplary implementation, measuring logic 530 may use the measured AC portion of the electrical signals to generate a pass-band characteristic curve with respect to frequency (act 650). For example, as described above, test device 310 may receive ASE generated by signal source 410. Test device 310 may also receive ASE generated from, for example, amplifiers along path 1 that generate CW ASE. Measuring logic 530 may measure the AC portion of the signal output by photo detector 520, which corresponds to the modulated ASE from signal source 410, and not measure the DC portion of the signal, which may correspond to CW ASE generated by amplifiers on path 1. As described above, the ASE generated by signal source 410 has a center frequency and an associated spectrum. In one implementation, measuring logic 530 may generate a pass-band curve which includes a center frequency and an associated spectrum with the received signal.

Figure 7:
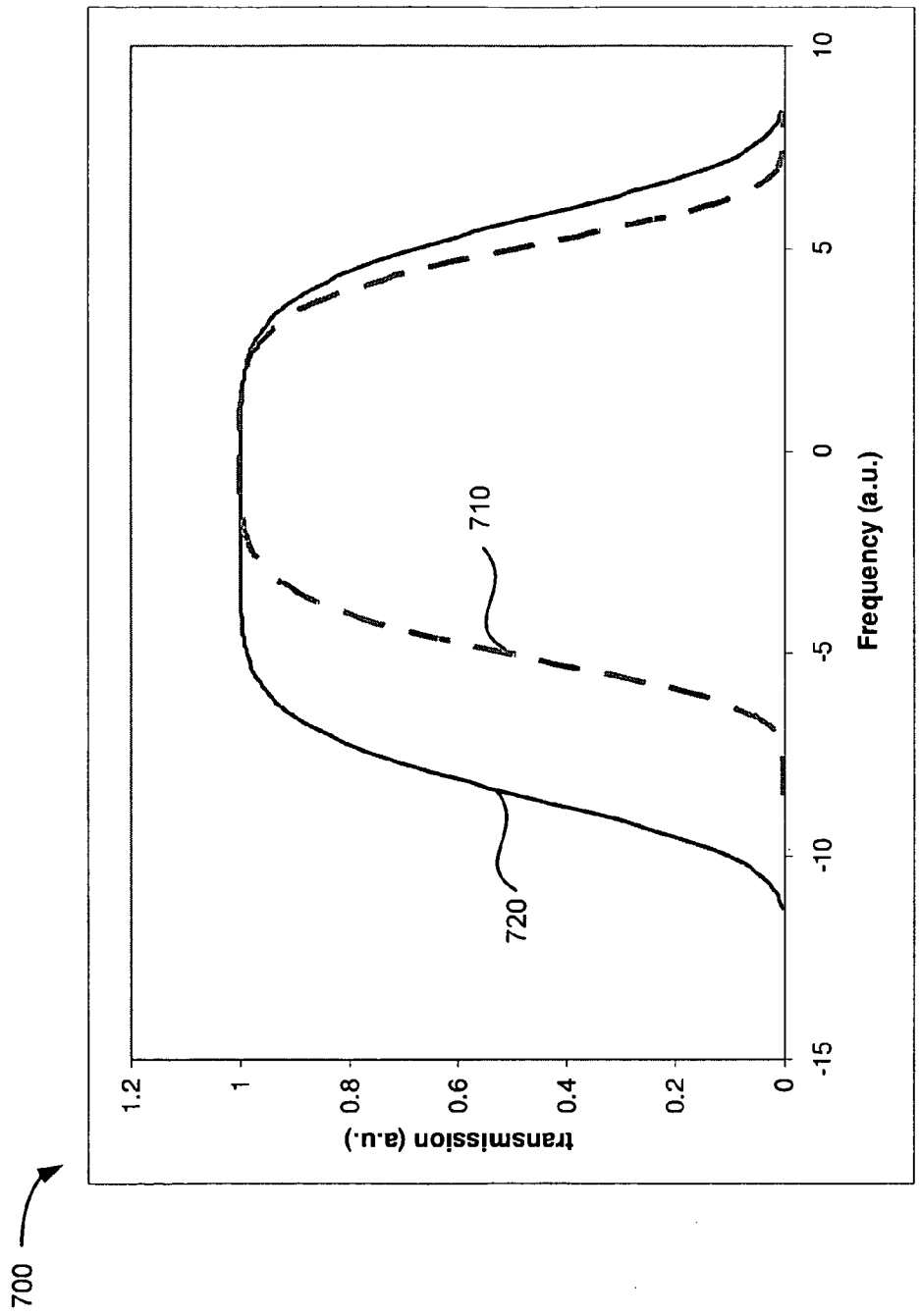
FIG. 7 is an exemplary output graph associated with the processing of FIG. 6.

For example, FIG. 7 illustrates an exemplary output 700 generated by measuring logic 530. Referring to FIG. 7, the x-axis of graphical output 700 corresponds to frequency in arbitrary units, where the zero represents the center frequency, and the y-axis corresponds to signal power in arbitrary units. In the example in FIG. 7, measuring logic 530 may normalize the highest measured AC value to a value of 1 illustrated on the y-axis. The frequency associated with the highest measured value will represent the center frequency of the received signal. Measuring logic 530 may generate values (e.g., from zero to one) for the other AC electrical signals output by photo detector 520 in relation to the highest value. As a result, curve 710 represents the spectrum for the measured ASE associated with the modulated test signal. That is, the pass-band characteristic of path 1 may correspond to curve 710 and may represent the spectrum of the test signal from signal source 410 that was received at node 110-6. A network engineer or other party may simply view output 700 and determine the pass-band characteristic of optical path 1. For example, a network engineer may determine a 3-dB bandwidth based on curve 710.

In some implementations, measuring logic 530 may also output the total ASE received at test device 310. For example, measure logic 530 may generate and output curve 720, which may represent the total ASE received by test device 310. The total ASE represented by curve 720 may include the ASE generated by signal source 410 as well as the ASE generated by various amplifiers and other devices in optical path 1. As illustrated, the total ASE curve 720 is much wider than output curve 710. This indicates that merely measuring total ASE received by test device 310 would provide an inaccurate measure of the pass-band of optical path 1.

As discussed above, curve 710 represents the end-to-end pass-band associated with path 1. In some implementations, measuring logic 530 may also automatically generate a pass/fail output signal indicating whether the pass-band characteristic meets or exceeds a desired threshold (act 650). For example, suppose that a 40 Gb/s signal needs an 18 GHz pass-band at 3-dB bandwidth. Measuring logic 530 may determine whether the received signal meets this threshold based on information associated with, for example, curve 710. If so, measuring logic 530 may provide a pass indication, such as a green light or other pass indication (e.g., text indicating "test passed"), on an output display associated with test device 310, to indicate that optical path 1 meets the desired network pass-band requirement. Similarly, if a 100 Gb/s signal transmitted on optical path 1 needs a 28 GHz pass-band at a 3-dB bandwidth or a 10 Gb/s signal transmitted on optical path 1 needs a 14 GHz pass-band at a 3-dB bandwidth, measuring logic 530 may generate a pass/fail indication based on the particular requirements and output the pass/fail indication on a display associated with test device 310. Providing a pass/fail indication may further simplify a network engineer's (or other party's) task with respect to testing a path and determining whether the path is operating in accordance with various network requirements/specifications.

In the manner described above, the total pass-band characteristic of optical path 1 may be determined without individually testing each ROADM in path 1. In addition, the end-to-end measurement may be performed without taking any active channels out of service. The end-to-end measurement may then be used to estimate the performance of network 100 and also for trouble shooting one or more channels/paths.

Implementations described herein provide for determining end-to-end pass-band characteristics of an optical path. The testing may be performed without taking any active channels out of service, thereby simplifying planning associated with network testing and also allowing network testing to be performed more frequently. This may allow network planners to identify problems in a network before outages occur.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, implementations have been described above with respect to using network engineers or technicians to connect various test devices to nodes 110 in network 100. In other implementations, all or some portion of network testing may be initiated and/or analyzed remotely. For example, in an exemplary implementation, test data (e.g., modulated test data) may be injected or transmitted on a particular path remotely from a control center or operations center associated with monitoring network 100. Similarly, test data received at a termination node of an optical path may be forwarded to the control center/operations center for analysis. In such instances, network engineers or technicians may not have to physically go to various nodes to initiate the test or analyze test results.

In addition, in some implementations, various ROADMs that represent initiating and terminating nodes in an optical path may include the test circuitry described above as being included in test device 300 and test device 310, respectively. In such instances, no separate test devices may be needed to perform end-to-end optical path testing.

Further, features have been described above as testing an optical path with a relatively small number of nodes/ROADMs. In other implementations, optical paths with more or less nodes/ROADMs and/or other devices may be analyzed.

In addition, while series of acts have been described with respect to FIG. 6, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
generating an amplified stimulated emissions (ASE) test signal;
modulating the ASE test signal;
transmitting the test signal on an optical path, the optical path including a plurality of add-drop multiplexer devices and a plurality of amplifiers, wherein the plurality of amplifiers generate continuous wave (CW) ASE;
receiving the modulated test signal at a destination device;
converting the received test signal into an electrical signal, wherein the electrical signal includes an alternating current (AC) portion corresponding to the modulated test signal and a direct current (DC) portion corresponding to the CW ASE;
measuring the AC portion of the electrical signal and not the DC portion, wherein the measured AC portion of the electric signal corresponds to a portion of the modulated test signal that passed through each of the plurality of add-drop multiplexers, and does not include CW ASE generated by the plurality of amplifiers;
generating, based on the measured AC portion of the electrical signal and not the DC portion, an output graph representing a pass-band associated with the optical path, wherein the generating the output graph comprises:
identifying a frequency in the measured AC portion of the electrical signal having a highest amplitude,
setting the frequency having the highest amplitude as a center frequency, and
generating values relative to the highest amplitude for measured AC portions of the electrical signal other than the center frequency; and
determining, based on the output graph, a pass-band characteristic of the optical path.

2. The method of claim 1, wherein determining a pass-band characteristic of the optical path comprises identifying a 3-decibel (db) bandwidth associated with the optical path.

3. The method of claim 1, further comprising:
identifying an idle channel on the optical path on which the test signal will be transmitted; and
ensuring that the identified channel will be powered or kept alive during testing of the optical path.

4. The method of claim 1, wherein the generating the ASE test signal, modulating and transmitting is performed by a transmitter test device, the method further comprising:
adjusting a tunable frequency of a first filter at the transmitter test device based on a frequency of a selected channel upon which the test signal is to be transmitted; and
filtering the generated test signal with the first filter, and wherein the generating the ASE test signal comprises:
turning on an amplified stimulated emission source (ASE) at the transmitter test device to generate the test signal.

5. The method of claim 4, wherein the first filter has a 0.5-decibel (dB) bandwidth of approximately 50 gigahertz (GHz), a 3-dB bandwidth of approximately 70 GHz and a 20-dB bandwidth of approximately 100 GHz.

6. The method of claim 1, wherein the receiving, converting and measuring is performed by a receiver test device, the method further comprising:

filtering the received test signal with a second filter at the receiver test device based on a frequency of a selected channel upon which the test signal is transmitted.

7. The method of claim 6, wherein the second filter has a 3-dB bandwidth of approximately 3 GHz and a 20-dB bandwidth of approximately 10 GHz.

8. The method of claim 1, further comprising:
generating a pass/fail indication associated with the pass-band characteristic of the optical path.

9. The method of claim 1, wherein the optical path includes a plurality of reconfigurable optical add-drop multiplexers.

10. The method of claim 1, wherein at least one of the generating the ASE test signal, modulating, receiving, converting or measuring is done remotely with respect to the optical path.

11. A system, comprising:
a first test device configured to be coupled to a first node in an optical path, wherein the optical path includes a plurality of nodes and at least one amplifier, the first test device comprising:
a signal source configured to generate amplified stimulated emissions (ASE) test data, and
a modulator coupled to the signal source, the modulator configured to modulate the ASE test data and forward modulated ASE test data onto the optical path; and
a second test device configured to be coupled to a last node in the optical path, the second test device comprising:
a filter configured to filter electromagnetic radiation received at the second test device,
circuitry configured to convert the filtered electromagnetic radiation into electrical signals, and
logic configured to:
measure an alternating current (AC) portion of the electrical signals corresponding to electromagnetic radiation associated with the modulated ASE test data that passed through the plurality of nodes in the optical path, and does not include continuous wave ASE generated by the at least one amplifier, and
determine a pass-band of the optical path based on the measured AC portion, wherein when determining a pass-band, the logic is configured to:
identify a frequency associated with the measured AC portion of the electrical signals having a highest amplitude,
set the frequency having the highest amplitude as a center frequency, and
generate values relative to the highest amplitude for measured AC portions of the electrical signals other than the center frequency.

12. The system of claim 11, wherein the first test device further comprises:
a filter configured to filter output of the signal source prior to modulating the test data or filter output of the modulator prior to forwarding the modulated test data onto the optical path.

13. The system of claim 11, wherein the signal source comprises an amplified stimulated emission source.

14. The system of claim 11, wherein the logic is further configured to:
generate a graph representing a pass-band characteristic of the optical path.

15. The system of claim 11, wherein the logic is further configured to:
determine whether the pass-band of the optical path meets a threshold associated with the optical path.

* * * * *